Nov. 23, 1965   E. A. STISSER   3,219,736
METHOD FOR PRODUCING HYDROSTATIC PRESSURE
Filed July 31, 1962
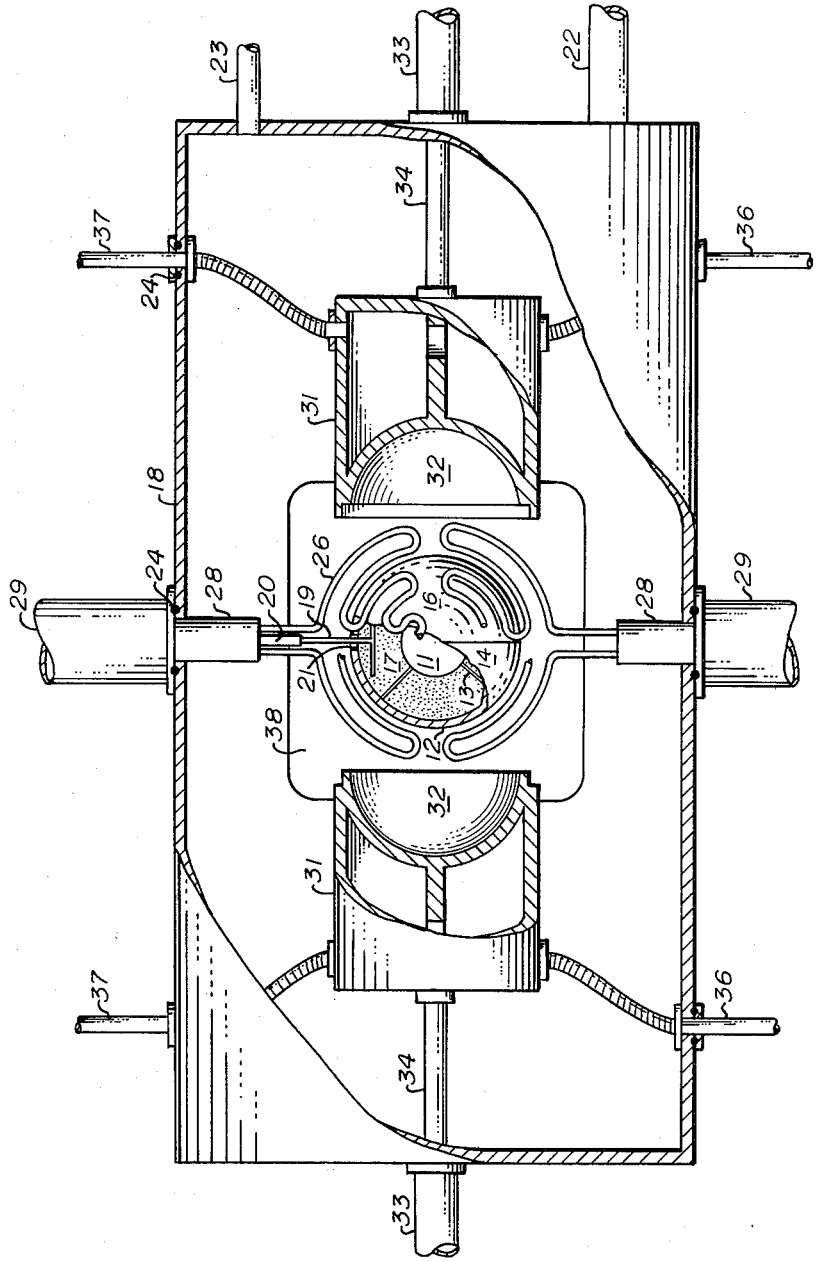
INVENTOR.
EUGENE A. STISSER
BY
ATTORNEY United States Patent Office 3,219,736
Patented Nov. 23, 1965

3,219,736
METHOD FOR PRODUCING HYDROSTATIC PRESSURE
Eugene A. Stisser, Pleasanton, Calif., assignor to the United States of America as represented by the United States Atomic Energy Commission
Filed July 31, 1962, Ser. No. 213,828
4 Claims. (Cl. 264—88)

The present invention relates to hydrostatic pressing and, more particularly, to a method for producing hydrostatic pressure at high temperatures.

Hydrostatic pressure is now commonly used to shape and compact materials into dense bodies. In the usual industrial practice, the material to be compacted or shaped is placed inside a contractable mold. This mold is then placed within a pressure chamber filled with a liquid and pressure is applied to the liquid, usually by means of a piston. This pressure is transmitted equally in all directions throughout the liquid. Therefore, every point on the surface of the contractable mold is subjected to the same pressure which, furthermore, is perpendicular to its surface at all points. As a consequence of this uniformity of pressure in both magnitude and direction, bodies which have been molded hydrostatically are less likely to contain internal stresses than those molded by other techniques.

For many applications of some materials, it has become increasingly important to be able to achieve homogeneous body densities approaching the theoretical density of these materials. For instance, such high densities are important in the formation of fuel elements for nuclear reactors to prevent fuel and fission product migration. In addition, since higher density homogeneous bodies have superior strength characteristics at high temperatures, it is desirable and even necessary to have such high density components for other high-temperature nuclear reactor applications and many space applications.

It has been found that densities approaching theoretical may be obtained in bodies of many materials by the simultaneous application of a high temperature and a high pressure. In attempting to apply heat and pressure at the same time, however, many difficulties have been encountered. For instance, one method of heating a body under pressure is to pass a high current therethrough. However, this method is dependent on the electrical characteristics of the body at high pressures and requires a means of containing the body in a suitable insulating medium while still allowing the application of a high pressure. In addition, neither this method nor any other method or apparatus devised prior to the present invention has been capable of subjecting a body to isostatic pressure during heating.

The present invention is a method capable of simultaneously subjecting a body to a very high temperature and pressure. Basically, the contraction of a rapidly cooled mass of molten metal is used to exert pressure on the body to be compressed. The body is surrounded by a material having a higher coefficient of thermal expansion which is then melted, thereby subjecting the body to a high temperature. The material is then rapidly cooled, the cooling reaching the body to be compacted last. Because of the greater thermal expansion of the melted material, this cooling will subject the body to be formed, while it is still at a high temperature, to a very high pressure.

It is therefore an object of the present invention to provide a novel method for compacting a body to a high density.

Another object of the present invention is to provide a method for simultaneously subjecting a body to a high isostatic pressure and a high temperature.

A further object of the present invention is to provide a method for compacting a body to a high density by the simultaneous application of heat and isostatic pressure.

Other uses, advantages, and objects of the present invention will be apparent to those skilled in the art upon a consideration of the following description taken with reference to the attached drawings, in which:

FIGURE 1 is a cut-away view of a preferred embodiment of the present invention.

In FIGURE 1, the preformed body to be compacted, for example ball 11, is centrally suspended within the interior of a hollow sphere 12. This body 11 is supported by a spider-like structure 13 of high melting-point temperature wires. The sphere 12 consists of two hemispheres 14 and 16 bonded together and filled with a fine powder 17 of a metal having a higher thermal coefficient of expansion than the body 11, and a melting point in the region of the ultimate temperature to which it is desired to subject the body. This material 17 should have a low reactivity rate with both the body 11 and the sphere 12 at this high temperature.

Sphere 12 is supported within a hermetically sealed housing 18 by means of supporting rod 19 which may be vertically adjusted by adjusting the coupling 20. The coupling 20 also allows the detachment of this sphere for removal from the housing 18. An opening 21 is provided in the upper portion of the sphere 12 to allow the introduction of powder 17 and to permit gases to escape therefrom during the heating cycle. The housing 18 has an outlet pipe 22 communicating with a conventional evacuation system (not shown), and an inlet pipe 23 for the introduction of an inert atmosphere. All penetrations into this housing are hermetically sealed, for example by O rings 24.

Induction heating coils 26 surround the sphere 12 and are rigidly attached to a driving piston 28 operated by conventional hydraulic cylinders 29 (partly shown) in order that the coils may be withdrawn from the sphere 12. Hollow cooling members 31 having mating, concave, hemispherical surfaces 32 sized to closely fit about the sphere 12 are shown in a withdrawn position relative to the sphere. Conventional hydraulic cylinders 33 advance or retract cooling members 31 by means of pistons 34. Flexible flow pipes 36 are provided to introduce a coolant into the interiors of the cooling members 31, and flexible pipes 37 act as coolant boiloff outlets. A hatch 38 is provided in the housing 18 to permit easy access to the sphere 12.

In assembling the apparatus, the body to be compacted is centrally positioned within hemispheres 14 and 16 by means of the wires 13. These hemispheres are then mated with the support rod 19 positioned to extend out through hole 21. Any desired temperature sensors, for example high temperature thermocouples, should be placed within the vessel also at this time. The hemispheres may be bonded together by any conventional technique dependent on their material.

Fine metal powder of the compressing material is then introduced into the sphere 12 through hole 21. The assembled apparatus is hung within the vessel 18 and the hatch 38 is closed and sealed.

Vessel 18 is then evacuated to approximately $10^{-6}$ mm. Hg and an inert gas, e.g., argon, is introduced therein to a pressure just sufficient to prevent arcing in the induction system. The heating coils 26 are then advanced to surround sphere 12 and are energized. The temperature of the sphere is raised to the desired compacting temperature which must be at least high enough to melt the compressing material. This heating should be done as fast as possible to insure that the compressing material will not react with either the sphere 12 or the body 11. During this heating, residual gases present in the compressing material 17 will evolve through hole 21. Since the compressing material is initially in the form of a fine powder, there will be no appreciable strain on the sphere 12 by its expansion.

During the latter stages of the heating, a coolant, e.g., liquid nitrogen, is introduced into cooling members 31 to lower their temperature.

When the body being compacted has reached the desired temperature, the coils 26 are retracted and the cooling members 31 rapidly advanced to closely surround the sphere. As the sphere 12 cools and contracts, the cooling members may be continuously advanced to keep them contiguous therewith.

The compressing material begins hardening first at the periphery of the sphere. A contracted, hard shell is formed which subjects the body to a high pressure. Since the cooling effect reaches the body last, the body remains substantially at the original high temperature during the application of this pressure.

The time that the pressure acts on the body may be controlled by varying the cooling rate after the outer periphery of the compressing materials hardened and contracted.

In one use of the invention, it was desired to compress one-inch spheres of uranium-loaded graphite to a high density. Since it has a very high melting point, graphite was used for sphere 12 and, because of its low reactivity rate with graphite, ruthenium in the form of a fine powder was used for the compressing material. Tungsten has a higher melting point and a low reactivity rate with ruthenium, and therefore tungsten wire was chosen for the spider wires 13. High temperature thermocouples were inserted into the ruthenium powder close to the uranium-loaded graphite spheres. The leads from these thermocouples were brought out through opening 21. The sphere was then hung within the vessel 18 which was sealed, evacuated, and filled with argon gas to a pressure of 250 plus microns.

The heating coils were advanced and the sphere rapidly heated until a temperature of approximately 2500° C. was reached, at which time the heating coils were retracted and the cooling members, precooled by liquid nitrogen, were rapidly advanced to be contiguous with the sphere. As the ruthenium hardened, a pressure of approximately 50,000 p.s.i. was exerted on the graphite body while it remained at a temperature of approximately 2400° C. This pressure continued until the cooling reached the graphite body, at which time it gradually lessened as the body cooled. The resulting product had a density of 99.9% theoretical.

In any particular application, the choice of a compressing material to be used for the sphere 12 will depend upon the material of the body to be compacted and the temperature and pressure to which it is desired to subject it. The compressing material should have a low reactivity rate with both the sphere and the body, and also have a lower melting temperature than either of them. For example, ruthenium, osmium, rhenium, and tantalum are suitable for the compressing material, while graphite, the ceramics such as beryllia, zirconia, and alumina, and cermets may be used for the sphere.

It should be noted that this method and apparatus are not limited to just compressing spheres; any desired shape may be compressed. Thus, while this invention has been described with respect to a preferred embodiment, the same is not meant to be a limitation on the scope of the invention. The scope should only be considered as limited by the following claims.

What is claimed is:
1. In a method of compacting a preformed body which has a density below its theoretical density, the steps of contiguously surrounding said body with a material having a substantially higher coefficient of thermal expansion and a lower melting point than said body, rapidly heating said body and said material to a temperature above the melting point of said material, cooling first the outer peripheral portion of said material to a temperature below its melting point to form a hard contracted shell, cooling the remainder of said material to a temperature below its melting point, said cooling reaching said preformed body last, thereby simultaneously subjecting said body to a high temperature and a high pressure, and thereafter removing said material from about said body.

2. In a method of compacting a preformed body which has a density below its theoretical density, the steps of suspending said body within a vessel, introducing a material having a substantially higher coefficient of thermal expansion and a lower melting point than said body into said vessel to contiguously surround said body, rapidly heating said body and said material to a temperature above the melting point of said material, cooling first the outer peripheral portion of said material to a temperature below its melting point to form a hard contracted shell, then cooling the remainder of said material to a temperature below its melting point, said cooling reaching said preformed body last, thereby simultaneously subjecting said body to a high temperature and a high pressure, and thereafter removing said vessel and said material from about said body.

3. In a method of compacting a preformed body which has a density below its theoretical density, the steps of centrally suspending said body within a spherical vessel having an opening in the upper portion thereof, introducing a material having a substantially higher coefficient of thermal expansion and a lower melting point than said body into said vessel to contiguously surround said body, said material being in powder form, rapidly heating said body and said material to a temperature above the melting point of said material, cooling first the outer peripheral portion of said material to a temperature below its melting point to form a hard contracted shell, then cooling the remainder of said material to a temperature below its melting point, said cooling reaching said preformed body last, thereby simultaneously subjecting said body to a high temperature and a high pressure, and thereafter removing said vessel and said material from about said body.

4. The method according to claim 3 wherein said material is selected from the group consisting of ruthenium, osmium, rhenium and tantalum, and said vessel is of a material selected from the group consisting of graphite, beryllia, zirconia, and alumina.

References Cited by the Examiner
UNITED STATES PATENTS

| | | | |
|---|---|---|---|
| 2,361,348 | 10/1944 | Dickson et al. | 18 |
| 2,398,132 | 4/1946 | Cottrell | 75—212 XR |
| 2,400,094 | 5/1946 | Benning et al. | 18—55 |
| 2,480,516 | 8/1949 | Stanier et al. | 22—216 XR |
| 2,568,157 | 9/1951 | Lepp et al. | 75—223 XR |
| 2,776,886 | 1/1957 | Kelly et al. | 75—223 XR |
| 2,828,225 | 3/1958 | Goetz et al. | 75—223 XR |
| 2,828,226 | 3/1958 | Goetz et al. | 75—223 XR |
| 3,051,774 | 8/1962 | Schelke | 18 |

ROBERT F. WHITE, *Primary Examiner.*
ALEXANDER H. BRODMERKEL, *Examiner.*